Aug. 30, 1960  O. R. NEMETH  2,950,598
AIR COOLED GAS TURBINE POWER PLANT
Filed Nov. 22, 1954

INVENTOR.
OTTO R. NEMETH
BY *Elliott & Pastoriza*
ATTORNEYS

United States Patent Office 2,950,598
Patented Aug. 30, 1960

2,950,598

AIR COOLED GAS TURBINE POWER PLANT

Otto R. Nemeth, 1325 Londonderry Place,
Los Angeles, Calif.

Filed Nov. 22, 1954, Ser. No. 470,457

4 Claims. (Cl. 60—39.51)

This invention relates generally to a gas turbine and more particularly to an improved structure for an integral, open cycle, axial flow gas turbine.

The design of efficient gas turbines is necessarily limited by certain metallurgical problems, especially with respect to high temperature operating conditions. Although all components must be considered, thermal considerations regarding the bearings, turbine blading, and shaft are of vast importance. Even with improved metals, ceramics, and other materials now available, the basic gas turbine structure must usually be modified and enlarged to accommodate additional parts and housings for an effective cooling system.

Thermal questions of another nature concern the necessary heat exchange equipment that is required if maximum performance is to be achieved. In this regard, the heat energy of the exhaust gases is particularly significant. The high temperature of these exhaust gases is desirably used to increase the temperature of compressed air entering the combustion chamber. However, in order to take advantage of this and other heat exchange methods of increasing efficiency, the basic gas turbine structure must again usually be increased in size and complexity.

With present-day gas turbines, in which the compressor and turbine are axially spaced along the driven shaft of the gas turbine structure, the spacial and structural aspects of adequate cooling and heat exchange apparatus becomes a problem of considerable importance.

It is therefore an object of the present invention to provide an improved gas turbine structure which is adaptable to the assemblage of a simplified cooling system.

Another object is to provide an improved gas turbine structure incorporating a basic construction adaptable to the application of efficient heat exchange requirements.

A further object is to provide an improved gas turbine structure particularly adaptable to limited space requirements.

Briefly, these and other objects and advantages of the present invention are attained by using a rotary member on which both the compressor and turbine means are circularly disposed around the shaft in radially spaced relationship. The gas turbine casing and shrouding is accordingly constructed so that air will pass through the compressor means in one direction to the combustion chamber, and will then be mixed with fuel and ignited to form combustion gases which will pass through the turbine means in an opposite direction. The turbine shrouding also functions to provide a heat exchange wall whereby the compressed air may be heated by the combustion gases to increase the efficiency of the turbine. A simplified cooling system is provided in part by passing air over the turbine shaft bearings, axially along the shaft, and then radially outwards within the rotary member.

A better understanding of the invention will be had by reference to the drawings, in which.

In order to facilitate an understanding of the operation of the gas turbine, the structural elements will first be identified.

Figure 1:
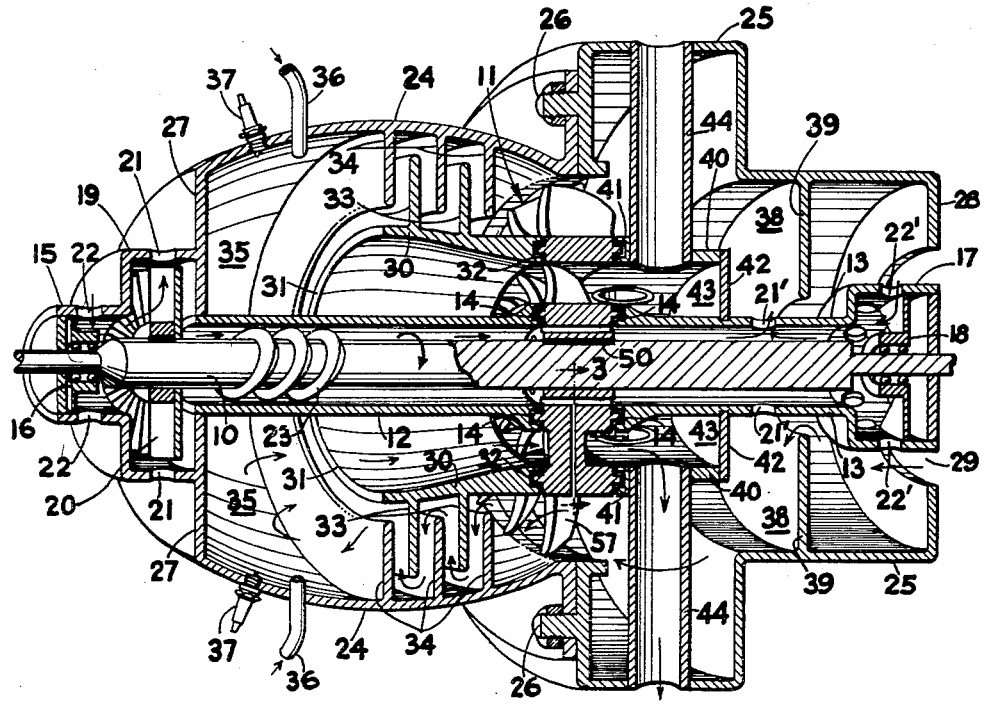
Fig. 1 is a cut-away perspective view of the improved gas turbine structure.

Referring to Fig. 1, there is shown a preferred form of a gas turbine structure according to the present invention, including a centrally disposed driving shaft 10. Secured to an intermediate portion of the shaft 10 is a rotary member, generally designated by the numeral 11, which will be subsequently described in detail in connection with Figs. 2 and 3. The shaft 10 is surrounded by a coaxially disposed inner casing structure transversely split to form a left inner casing 12 and a right inner casing 13 and thereby accommodate the interposition of the rotary member 11. (The words "left" and "right" are used throughout the specification to denote respective sides of the rotary member as viewed in Fig. 1.) The opposing ends of the left inner casing 12 and the right inner casing 13 are recessed to form circular grooves 14 for receiving annular projecting flanges on the rotary member, to be described hereafter. The other end of the left inner casing 12 terminates in a bearing housing 15 supporting therein a left bearing 16 for the shaft 10. The other end of right inner casing 13 similarly terminates in a bearing housing 17 supporting a right bearing 18 for the shaft.

An enlarged diameter portion of the left bearing housing 15 forms an auxiliary housing 19 for enclosing a centrifugal fan 20 secured to the shaft 10. The auxiliary housing 19 has a plurality of circular, cooling air outlet openings 21 about its periphery; similarly, bearing housing 15 has a plurality of circular, cooling air inlet openings 22 adjacent the bearing 16 about its periphery. Another set of air inlet openings 22' are located on the periphery of the right bearing housing 17, and the right inner casing end portion is provided with air inlets 21', the purpose for which will become clear as the description proceeds.

Fragmentarily shown extending along the shaft 10 within the left inner casing 12 is a spiraling cooling fin 23.

The inner casing structure and the rotary member 11 are surrounded by an outer split-casing radially spaced from the inner casing and consisting of a left outer casing 24 and right outer casing 25, joined together substantially in the plane of the rotary member 11 by bolts 26. The left outer casing 24 terminates at its unbolted end in an end wall 27 extending radially inwards to join with the outer periphery of the left inner casing 12. In the structure shown, a portion of the end wall 27 is common to an annular side wall of the auxiliary housing 19. The unbolted end of the right outer casing 25 terminates in an end wall 28 having a circular opening defining, with bearing housing 17, an annular air intake 29.

A generally cylindrical shell in the form of a shroud 30 is disposed on the left side of the rotary member 11 and radially positioned between the left outer casing 24 and the left inner casing 12. The shroud 30 has a free end 31 spaced a given axial distance from the end wall 27; its other end is provided with a circular groove 32 cooperating with an annular flange on the rotary member, similar to grooves 14 provided on the left and right inner casings 12 and 13. The shroud 30 has a plurality of baffling vanes 33 extending radially outward from its outer surface. A similar set of baffling vanes 34 extend radially inwards from the inner surface of the outer casing 24, and are positioned to project, respectively, between the vanes 33, as shown clearly in Fig. 1.

In the given distance between the free end 31 of the shroud 30 and the end wall 27 of the left outer casing 24, there is formed a combustion chamber 35, provided with fuel nozzles 36 and spark plugs 37, as indicated diagrammatically in Fig. 1.

The right outer casing 25, together with the outer surface of the right inner casing 13, defines an air intake chamber 38 extending from the annular air inlet opening 29 to the rotary member 11. Near the bearing housing 17, an annular guide vane 39 projects radially into the air intake chamber 38, terminating short of the right inner casing 12.

From the right side of the rotary member 11 there is provided a cylindrical wall 40 coaxially disposed about shaft 10 and projecting into the air intake chamber 38. This wall 40 has a recessed circular groove 41 (similar to groove 32) for receiving an annular flange on the rotary member 11, as will be subsequently described. The other end of the cylindrical wall 40 is closed off by an end plate 42 joining the outer surface of the right inner casing 13. The wall 40, end plate 42, and right inner casing 13 define an annular gas outlet chamber 43, which is closed off from the air intake chamber 38 and is exposed at its left end to a portion of the rotary member 11. Communicating with chamber 43 are a plurality of elliptical shaped gas outlet tubes 44 arranged in a spoke-like configuration and radially extending from openings in the cylindrical wall 40 to similar openings in the right outer casing 25.

Figure 2:
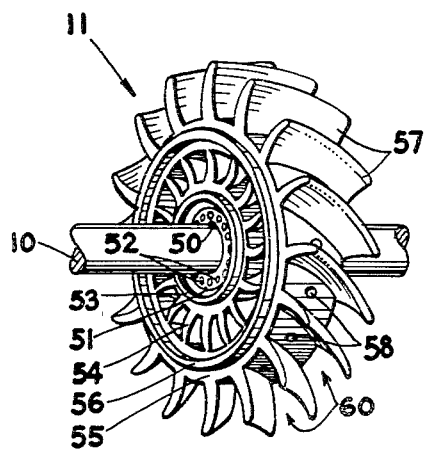
Fig. 2 is a perspective view of the rotary member included in the gas turbine structure of Fig. 1.

The structural details of the rotary member 11 are more clearly shown in Fig. 2. As shown, the rotary member is attached to the shaft 10 by a key 50. Adjacent the shaft, the rotary member has an inner ring portion 51 including a plurality of axial directed cooling ducts 52 extending through the thickness of the rotary member and disposed such that they register with the cavity formed between the shaft and the inner casing structure. Projecting from the inner ring 51 on the left and right sides of the rotary member are circular flanges 53 adapted to mate with grooves 14 on the left and right inner casing of Fig. 1.

Turbine blades 54 are secured to the outer radial surface of the inner ring 51 and have their outer tips fixed to the inner surface of an outer ring portion 55 of the rotary member. The outer ring portion 55 similarly has circular flanges 56, adapted to be inserted on the left side within grooves 32 of the wall 30 and on the right side within grooves 41 of the wall 40 in Fig. 1. The outer radial surface of the outer ring portion 55 serves as a securing means for a set of compressor blades 57.

Figure 3:
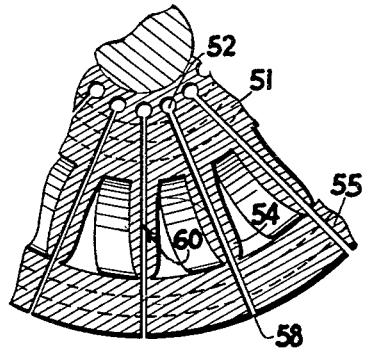
Fig. 3 is a cross-section view of the portion indicated by the arrows 3 of Fig. 1 without the compressor blading being shown.

As shown clearly in Fig. 3, a plurality of apertures 58 on the outer surface of the outer ring portion 55 register with a series of cooling passages 60 extending radially through the rotary member from the cooling ducts 52. These cooling passages 60 pass through the inner ring portion 51, the turbine blades 54, and then through the outer ring portion 55 to the apertures 58.

The operation of the gas turbine will now be described. Referring to Fig. 1, air is drawn through the annular air intake opening 29 into the air intake chamber 38 shown at the right hand end of the turbine. This air flows around the guide vane 39 and the gas outlet chamber 43 to pass over the gas outlet tubes 44. The major elliptical axes of these tubes are in the direction of the air flow to offer the least resistance thereto and the largest heat exchange area. The air continues through the compressor blading and, after compression, flows through the baffling vanes 33 and 34 in the outer annular passage between the shroud 30 and the left outer casing 24. After passing through this baffling structure, the air enters the combustion chamber 35 in its compressed state. At this time it is mixed with fuel from the fuel injection nozzles 35 and then ignited by spark plugs 36. After ignition, the hot combustion gases expand towards the rotary member through the inner annular passage between the shroud 30 and the left inner casing 12 to drive the turbine blading 54 and rotate the rotary member and shaft. The baffling vanes offer a resistance towards any movement of the combustion gases back through the outer annular passage between the shroud 30 and the left outer casing 24.

After passing through the turbine blades 54, the combustion gases flow into the gas outlet chamber 43 and through the gas outlet tubes 44 to exhaust.

The grooves 14 together with flanges 53 form gas traps, tending to prevent the flow of combustion gases therethrough, and yet at the same time permit rotational movement of the rotary member 11 with respect to the stationary left inner casing 12 and right inner casing 13. Similarly, the grooves 32 and 41 together with the flanges 56 form gas traps tending to prevent interflow between the combustion gases driving the turbine blades 54 and the air moving between the compressor blades 57.

The cooling system includes means for cooling the bearings, shaft, and turbine blades. The centrifugal fan 20 in the auxiliary housing 19 at the left end of the turbine acts to draw in air through the inlet openings 22 in the bearing housing 15 and exhaust a first portion of the air out through the outlet openings 21 in the auxiliary housing. The bearing 16 is designed to be spaced and supported within the housing 15 in such a manner as to provide an annular cooling chamber between the bearing and the housing through which the air may pass in moving from the inlet openings 22 to the outlet openings 21, thus effecting cooling of the bearing 16.

A second portion of the air passing through the inlet openings 22 is drawn along the shaft 10 towards the right side of the rotary member 11. This action is caused by the low pressure in the air intake chamber 38 (as a result of compressor blade movement), which is communicated through the inlet opening 21' to the annular cavity between the inner casing structure and the shaft 10. The suction effect of the air intake chamber 38 will usually be sufficient to overcome any tendency of the air to move towards the left along the shaft 10 because of the action of the centrifugal fan 20. Further, the fins 23 on the rotating shaft 10 are spiraled to aid movement of air in this direction. These fins also serve as cooling fins for the shaft.

Thus, the second portion of air will pass to the right along the shaft 10 and about the cooling fins 23 until it flows into the registering cooling ducts 52 on the impeller 11. At this point a part of the second portion will flow radially upwards through the cooling passages 60 to cool the turbine blades 54, being drawn in this direction by the centrifugal forces setup by rotation of the rotary member, and then be exhausted through apertures 58 on the outer ring 55 of the rotary member. The other part of the second portion of the air will continue through the axial ducts 52 to the right side of the rotary member and be drawn up through the inlet opening 21' into the air intake chamber 38.

The suction effect of the air intake chamber 38, which is transmitted to the cavity between the shaft and the inner casing structure, will also tend to draw air through inlet openings 22' through a similar chamber around bearing 18 to the internal outlet opening 21' to enter the air intake chamber, thus effecting the cooling of bearing 18.

The design of the gas turbine structure according to the present invention is particularly well suited for achieving maximum heat exchange efficiency. The shroud 30 is preferably made of heat conductive material, and thus the hot combustion gases passing through the inner annular passage within the shroud in one direction will increase the temperature of the compressed air flowing through the outer annular passage around the outside of the shroud in the opposite direction. Also under certain operating conditions, it may be desirable to heat the air prior to its movement between the compressor blades 57. In such instances, gas outlet tubes 44 may also be formed of heat conductive material so that the air passing through the air intake chamber 38 around these tubes will be heated before compression.

For purposes of clarity, certain well known structural details, modifications, and refinements have not been shown in the drawings. For example, stationary or stator compressor blading would normally be provided in directing the flow of the air into and out of the compressor blades 57. In addition, some form of starting motor would usually be required to rotate the rotary member and start the cycle of operation. Also, in practical usage, the shaft 10 would usually be connected by an extension, gearing, or the like to a driven unit.

It will also be apparent that various modifications can be made to the particular structure shown which will still be within the scope and spirit of this invention. Only one stage of blading has been shown, although two or more stages of compressor or turbine blading could readily be adapted to the basic rotary member structure. The rotary member 11 has been shown secured to the shaft 10 by a key 50; in other forms, for example, the rotary member could be formed inetgral with the shaft or coupled between two portions of the shaft. It will also be noted that the cooling passages 60 shown in Fig. 3 have been illustrated in their simplest form. To effect greater cooling of the blades 54, hollow blades could be used having minute internal tubing or partitioning structures, such as are well known in the art.

It is apparent that the gas turbine structure of the present invention provides a high speed unit adaptable to limited spacial requirements, which still is capable of providing the higher efficiency of more complex and larger gas turbine power plants.

What is claimed is:

1. A gas turbine, comprising, in combinaton: a shaft; an outer casing surrounding said shaft and having an air inlet means and an exhaust gas outlet means; bearing means for said shaft supported within said outer casing; a rotary member disposed within said outer casing and secured to said shaft; compressor means circularly disposed on said rotary member to surround said shaft, and adapted to axially receive air passing through said air inlet means from one side of said rotary member; an end wall for said outer casing defining a combustion chamber on the other side of said rotary member adapted to receive air from said compressor means; means for injecting fuel into said combustion chamber; means for igniting a fuel-air mixture formed in said combustion chamber to provide combustion gases; turbine means circularly disposed on said rotary member and spaced radially from said compressor means; shrouding means disposed within said outer casing to guide said combustion gases from said combustion chamber through said turbine means to said exhaust gas outlet means, an inner cylindrical casing surrounding and co-axial with said shaft, and defining a wall for said combustion chamber, said inner casing being supported within said outer casing and divided to accommodate the interposition of said rotary member; and a plurality of axially directed cooling ducts extending through said rotary member and spaced radially inwards of said turbine means in communication with an annular cavity defined by said inner casing and said shaft.

2. A gas turbine, comprising, in combination: a shaft; an outer casing surrounding said shaft and having an air inlet means and an exhaust gas outlet means; a rotary member disposed within said outer casing and secured to said shaft; compressor means circularly disposed on said rotary member to surround said shaft, and adapted to axially receive the air passing through said air inlet means from one side of said rotary member; an end wall for said outer casing defining a combustion chamber on the other side of said rotary member adapted to receive air from said compressor means; means for injecting fuel into said combustion chamber; means for igniting a fuel air mixture formed in said combustion chamber to provide combustion gases; turbine means circularly disposed on said rotary member and spaced radially from said compressor means; shrouding means disposed within said outer casing to guide said combustion gases from said combustion chamber through said turbine means to said exhaust gas outlet; an inner cylindrical casing surrounding and co-axial with said shaft, supported within said outer casing and divided to accommodate the interposition of said rotary member; a plurality of axially directed cooling ducts extending through said rotary member and spaced radially inwards of said turbine means in communication with an annular cavity defined by said inner casing and said shaft; and, a first bearing structure adjacent the air intake means at said one side of the rotary member and a second bearing structure on said other side of the rotary member, said inner casing having its ends terminating in housings for said first and second bearing structures, respectively, said housings defining cooling chambers communicating with said annular cavity.

3. The combination of claim 2, in which a portion of said shaft is provided with fins disposed within said annular cavity; an air pumping means positioned within said inner casing and operatively connected to said shaft to circulate air through said cooling chambers, through said annular cavity, and through said cooling ducts.

4. In a gas turbine: a shaft; a rotary member secured to said shaft; compressor means circularly disposed on said rotary member; turbine means circularly disposed on said rotary member and spaced radially inwards of said compressor means; an outer casing surrounding said shaft and rotary member; an inner cylindrical casing surrounding said shaft and divided to accommodate the interposition of said rotary member; a combustion chamber on one side of said rotary member defined in part by said outer casing and said inner casing; a plurality of axially directed cooling ducts extending through said rotary member and spaced radially inwards of said turbine means in communication with an annular cavity defined by said inner casing and said shaft; said shaft having a portion thereof provided with fins disposed within said annular cavity; and, an air pumping means positioned within said inner casing and operatively connected to said shaft to circulate air through said annular cavity and through said cooling ducts.

References Cited in the file of this patent

UNITED STATES PATENTS

| 2,358,301 | Brauns | Sept. 19, 1944 |
| 2,445,837 | McKenzie | July 27, 1948 |
| 2,454,738 | Hawthorne | Nov. 23, 1948 |
| 2,543,864 | Melenric | Mar. 6, 1951 |
| 2,578,481 | Lombard | Dec. 11, 1951 |
| 2,656,146 | Sollinger | Oct. 20, 1953 |

FOREIGN PATENTS

| 963,823 | France | Jan. 18, 1950 |